US008533724B1

(12) United States Patent
Theimer et al.

(10) Patent No.: US 8,533,724 B1
(45) Date of Patent: Sep. 10, 2013

(54) VIRTUAL RESOURCE PROVISIONING BY ASSIGNING COLORS TO VIRTUAL RESOURCES IN MULTI-TENANT RESOURCE POOL

(75) Inventors: Marvin M. Theimer, Bellevue, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 228 days.

(21) Appl. No.: 12/973,746

(22) Filed: Dec. 20, 2010

(51) Int. Cl.
*G06F 9/46* (2006.01)
*G06F 9/455* (2006.01)

(52) U.S. Cl.
USPC .............................................. 718/104; 718/1

(58) Field of Classification Search
None
See application file for complete search history.

(56) References Cited

U.S. PATENT DOCUMENTS

| | | | |
|---|---|---|---|
| 5,812,750 A | 9/1998 | Dev et al. | |
| 7,743,127 B2* | 6/2010 | Santos et al. | 709/223 |
| 2001/0023440 A1* | 9/2001 | Franklin et al. | 709/226 |
| 2002/0143786 A1 | 10/2002 | Ayi et al. | |
| 2004/0260796 A1 | 12/2004 | Sundqvist et al. | |
| 2005/0198243 A1 | 9/2005 | Snible et al. | |
| 2005/0198333 A1 | 9/2005 | Dinges et al. | |
| 2005/0267887 A1 | 12/2005 | Robins | |
| 2006/0206485 A1 | 9/2006 | Rubin et al. | |
| 2007/0214497 A1 | 9/2007 | Montgomery et al. | |
| 2008/0163124 A1 | 7/2008 | Bonev et al. | |
| 2010/0050173 A1* | 2/2010 | Hensbergen | 718/1 |
| 2010/0312871 A1 | 12/2010 | DeSantis et al. | |
| 2011/0022711 A1 | 1/2011 | Cohn | |
| 2011/0029675 A1 | 2/2011 | Yeow et al. | |
| 2011/0078652 A1 | 3/2011 | Mani et al. | |
| 2012/0096165 A1* | 4/2012 | Madduri et al. | 709/226 |

OTHER PUBLICATIONS

Houidi et al., "Virtual Resource Description and Clustering for Virtual Network Discovery", (Jun. 14-18, 2009), Communications Workshops, 2009. ICC Workshops 2009. IEEE International Conference.*
Jordan, "How to Connect Windows XP with Vista in a LAN", (Oct. 9, 2010), p. 1 [retrieved from http://web.archive.org/web/20101009082913/http://www.ehow.com/how_5845684_connect-windows-xp-vista-lan.html on Oct. 15, 2012].*
U.S. Appl. No. 13/074,982, Optimizing Communication Among Collections of Computing Resources. Filed Mar. 29, 2011.

* cited by examiner

*Primary Examiner* — Meng An
*Assistant Examiner* — James J Lee
(74) *Attorney, Agent, or Firm* — Kilpatrick, Townsend & Stockton, LLP

(57) ABSTRACT

Virtual resource provisioning may be enhanced by coloring virtual resource instances and/or underlying implementation resources. Particular resource colors may be associated with particular treatments during allocation of implementation resources to virtual resources. There may be different types of colors corresponding to different types of allocation treatment. Exclusory colors may be utilized to reduce clustering of virtual resources with respect to implementation resources. Assignment of exclusory colors to virtual resources can help strike a balance between lower costs through efficient implementation resource utilization and higher fault tolerance through spreading across an available implementation resource pool. Inclusive colors may be utilized to require and/or prefer allocation of virtual resources to implementation resources painted with the inclusive color. Proximity colors may be utilized to enhance a computational performance of a set of virtual resources. Proximity colors may be associated with proximity specifications that define proximity in implementation resource networks.

26 Claims, 10 Drawing Sheets

VIRTUAL RESOURCE PROVISIONING BY ASSIGNING COLORS TO VIRTUAL RESOURCES IN MULTI-TENANT RESOURCE POOL

BACKGROUND

It has become common for individuals and organizations to use computers and networks of computers to perform and assist in a wide variety of activities. Rather than owning and maintaining physical computers and associated facilities, it is becoming more and more common to provision virtual computer systems and other virtual computing resources with a specialized provider of such virtual resources. Such virtual resource provisioning can provide a number of advantages such as reduced cost of desired services and/or rapid response to changing service needs. However, conventional virtual resource provisioning has a number of shortcomings.

Virtual resource providers may operate large "fleets" of computer hardware and other resources used to implement the virtual resources provisioned to customers. It is not uncommon for there to be a deliberate layer of abstraction between the virtual computing resources and the underlying implementation resources that decouples the two from a user's point of view. Such decoupling can enable a virtual resource provider to engage in sophisticated allocation and re-allocation of the underlying implementation resources for purposes including efficient implementation resource utilization, load balancing and fault tolerance, without requiring the user to be concerned with implementation details. However, at times, users can become concerned about particular implementation details, for example, due to security concerns and regulatory requirements. Some conventional virtual resource providers attempts to address such concerns can have significant negative impacts on implementation resource allocation efficiency and/or effectiveness including increased computational and/or financial cost, and reduced fault tolerance.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
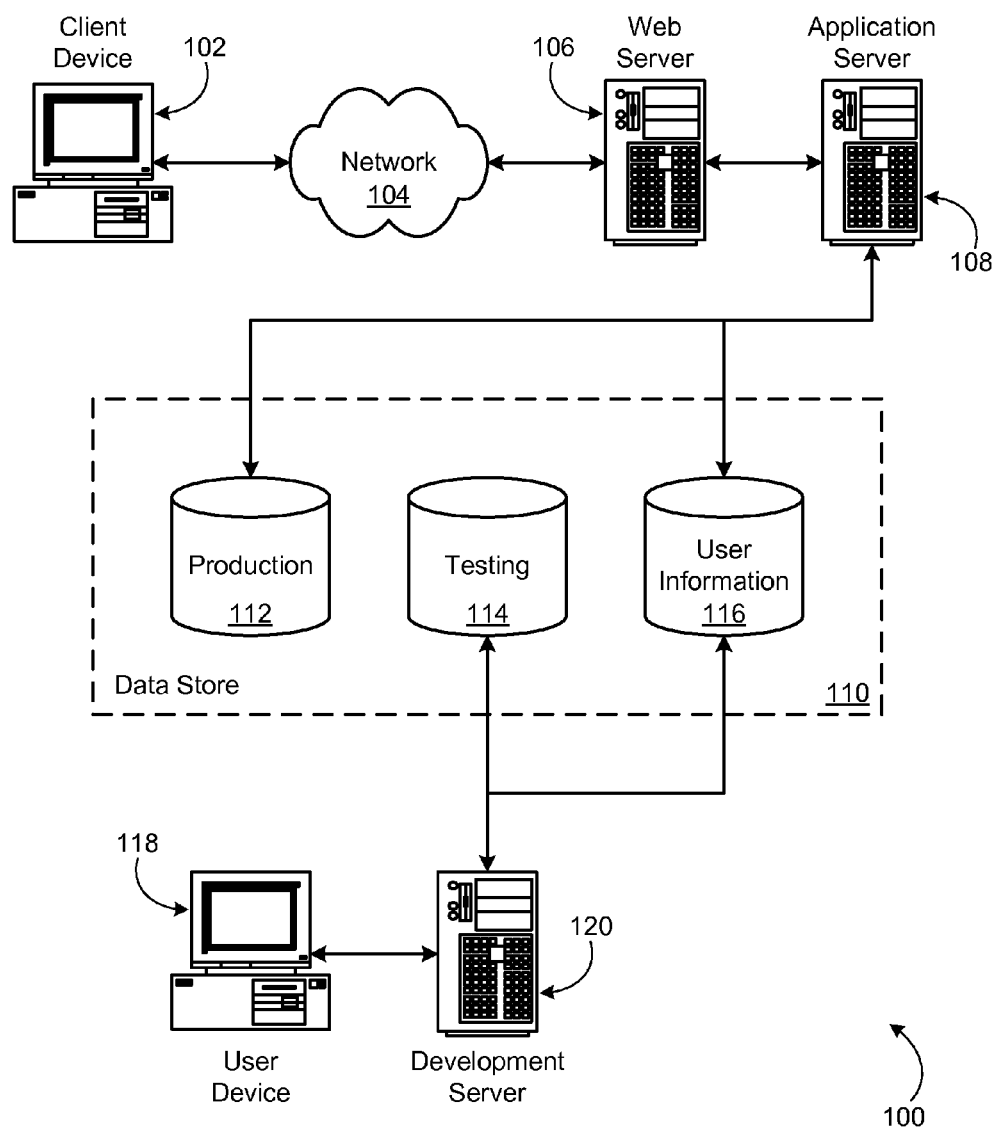
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Virtual resource provisioning may be enhanced by "coloring" virtual resource instances and/or underlying implementation resources. Particular resource colors may be associated with particular treatments during allocation of implementation resources to virtual resources. The term "color" is used herein in a graph theoretic sense. For example, a color may correspond to an alphanumeric string or other suitable distinguishing identifier specified by a user. Association with the identifier may color a resource. In at least one embodiment, there may be different types of colors corresponding to different types of allocation treatment. For example, the types of color may include an exclusory color type, an inclusive color type and/or a proximity color type.

The exclusory color type may be utilized to reduce clustering of virtual resources with respect to implementation resources. At least some implementation resources may correspond to points of failure. For example, a particular virtual computing system (VCS) server may at least partially implement a particular set of virtual computer systems. A failure of the VCS server can result failure of the entire set of virtual computer systems. By default, a virtual resource provider may be configured to allocate virtual resources to implementation resources (and/or implementation resources to virtual resources) so as to reduce the impact of such implementation resource failures. For example, the virtual resource provider may lower a chance of correlated failure of a set of virtual resources (e.g., belonging to a particular customer) by "spreading" the virtual resources thinly across a relatively large number of implementation resources. However, a particular customer may request allocation constraints that compromise this strategy. For example, the customer may request that the set of virtual resources be implemented by a smaller pool of implementation resources and/or implementation resources that are dedicated to the customer.

Assignment of exclusory colors to virtual resources can help strike an optimal balance between lower costs through efficient implementation resource utilization (e.g., through clustering) and higher fault tolerance through spreading across an available implementation resource pool. Virtual resources associated with an exclusory color can color ("paint") implementation resources that participate in implementing those virtual resources. The allocation algorithm may require and/or prefer implementation resources not yet associated ("painted") with the exclusory color for newly requested virtual resources that are associated with that exclusory color. For example, a first virtual computer system associated with an exclusory color labeled "red" may paint a first VCS server that implements the first virtual computer system the exclusory color "red". A second virtual computer system associated with the exclusory color "red" may be excluded from the first VCS server. Colors may be scoped to particular customers or sets of customers (e.g., the exclusory color "red" utilized by two customers may be treated as two colors), and/or be scoped at the virtual resource provider level so that there is one set of colors utilized by the customers of the virtual resource provider.

The inclusive color type may be utilized to require and/or prefer allocation of virtual resources associated with an inclusive color to implementation resources painted with the inclusive color. Inclusive colors may be utilized to increase implementation resource utilization efficiency and/or enhance a computational performance within particular implementation resource pools, across particular sets of implementation resource pools including implementation resource pools associated with different customers, and/or among implementation resources of particular types. For example, virtual computer systems associated with a particular inclusive color labeled "green" may be implemented with a set of specially configured VCS servers painted "green".

The proximity color type may be utilized to enhance a computational performance of a set of virtual resources. The implementation resources of the virtual resource provider may be interconnected to one another in various ways and by communication connections of various capacities. Proximity between two implementation resources in the implementation resource network may correspond to a quality of a communication connection between the two implementation resources. For example, two implementation resources may be closer in the implementation resource network when a communication connection between the two implementation resources is of higher bandwidth and/or lower latency. Implementation resources that participate in the implementation of virtual resources associated with a particular proximity color, and implementation resources that are proximate and/or nearby in the implementation resource network, may be painted with the proximity color. The allocation algorithm may require and/or prefer implementation resources already painted with the proximity color when allocating new virtual resources associated with the proximity color. In at least one embodiment, proximity colors may be associated with one or more proximity specifications that define proximity in the implementation resource network for the proximity colors.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
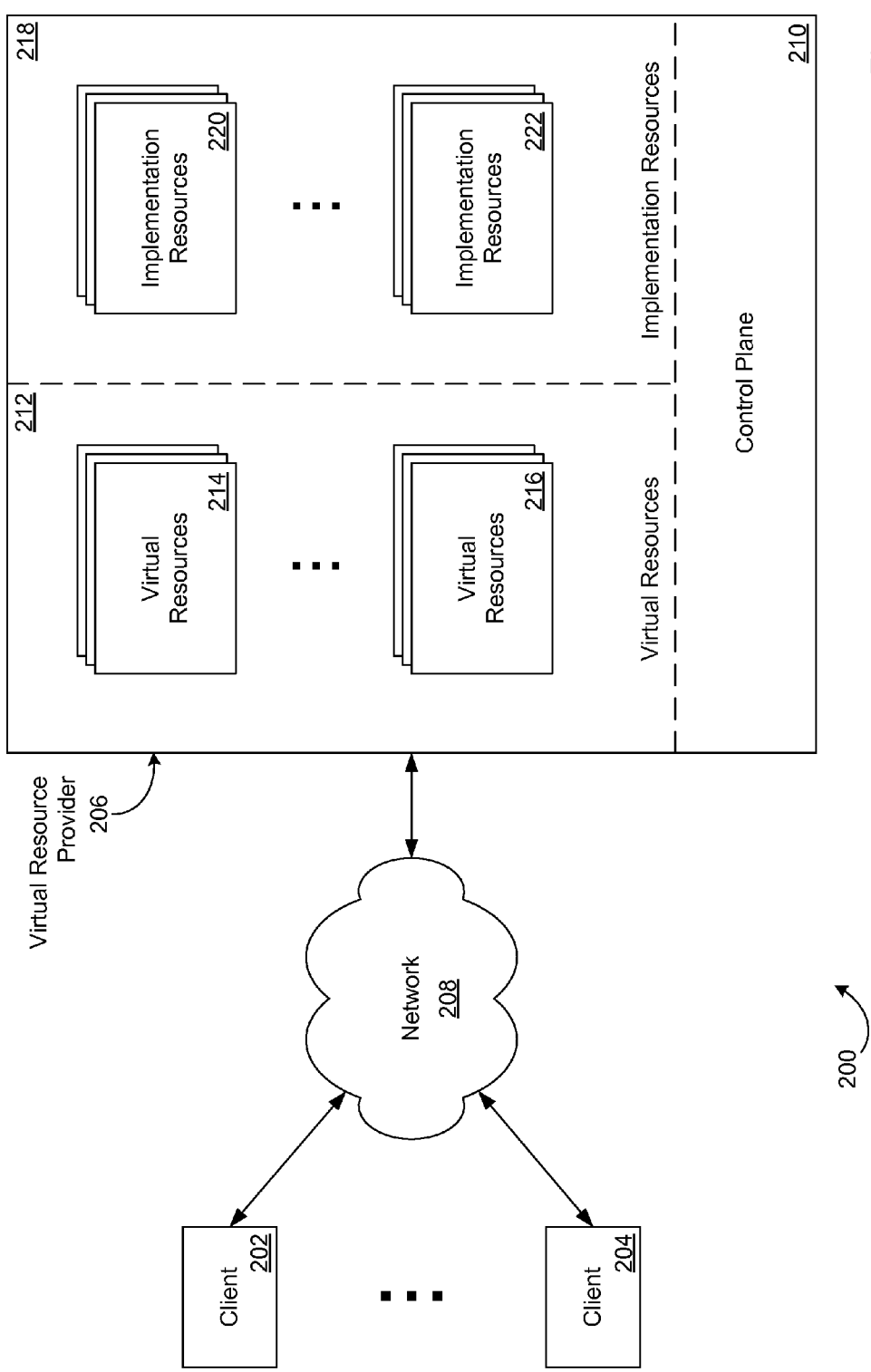
FIG. 2 is a schematic diagram depicting aspects of an example virtual resource provisioning architecture in accordance with at least one embodiment.

In at least one embodiment, one or more aspects of the environment 100 may incorporate and/or be incorporated into a virtual resource provisioning architecture. FIG. 2 depicts aspects of an example virtual resource provisioning architecture 200 in accordance with at least one embodiment. The example virtual resource provisioning architecture 200 includes multiple clients 202-204 communicatively connected to a virtual resource provider 206 over a network 208. For example, the clients 202-204 may corresponding to computing devices such as the computing device 102 of FIG. 1 and/or client programs incorporated into such computing devices. The ellipsis between the client 202 and the client 204 indicates that the virtual resource provisioning architecture 200 may include any suitable number of clients although, for clarity, only two are shown in FIG. 2. Ellipses are used similarly throughout the drawings.

One or more of the clients 202-204 may be utilized by one or more customers of the virtual resource provider 206 to interact with a control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable type and/or number of virtual resources 214-216. Examples of suitable virtual resources 212 include virtual computer systems, virtual network connections, virtual data stores, specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable type and/or number of implementation resources 220-222. Each of the virtual resources 214-216 may be implemented by a set of the implementation resources 218. In at least one embodiment, various implementation resources of the implementation resources 218 may be configured to participate in implementing, at least in part, multiple virtual resources of the virtual resources 212. Examples of suitable implementation resources 220-222 include virtual computer system (VCS) servers, data store servers, computers, server racks, networking hardware including switches, routers, gateways, bridges, hubs, repeaters, firewalls, and wireless transceivers, power supplies, generators, data centers, rooms in data centers, mobile data centers, as well as non-volatile storage devices including hard drives, processing units such as central processing units (CPUs), caches in processing units, processing cores in multi-core processing units, volatile storage devices such as memory modules including random access memory (RAM) modules, and RAM chips of multi-chip memory modules, network interface hardware and suitable combinations thereof. The control plane 210 may process virtual resource provisioning requests, manage allocation of virtual resources 212 to implementation resources 218 and/or manage allocation of implementation resources 218 to virtual resources 212. An example virtual resource provider control plane in accordance with at least one embodiment is described below in more detail with reference to FIG. 3.

Particular implementation resources 218 and/or particular sets of implementation resources 218 may correspond to points of failure and/or to failure risk domains associated with a failure probability and/or an annualized failure rate (AFR). For example, a particular type of hard drive may have an AFR of 1%. A data center may correspond to a risk domain capable of operating within specifications 99.8% of the time. At least a subset of such implementation resources and/or risk domains may be colorable. That is, the control plane 210 may associate such implementation resources and/or risk domains with a color for provisioning and/or allocation purposes. Further examples of colorable risk domains include geographical regions including earthquake risk zones and flood risk zones, domains defined by regulatory boundaries including political boundaries and organizational boundaries, domains corresponding to independent virtual resource providers, and domains corresponding to any suitable set of implementation resources.

At least a subset of the implementation resources 218 may implement, at least in part, multiple virtual resources, that is, may be multi-instance implementation resources. Multi-instance implementation resources may have a capacity measurable in implementation resource allocation units ("allocation units" or "slots") corresponding to minimum allocable portions of the multi-instance implementation resources. Some virtual resources may require no more than one allocation unit from a multi-instance implementation resource, other virtual resources may require multiple allocation units. For example, a VCS server may have a capacity of sixteen allocation units, and a "small" type virtual computer system may require a single allocation unit at the VCS server, whereas a "large" type virtual computer system may require four allocation units at the VCS server. The virtual resource provider 206 may maintain virtual resources for multiple customers. When a multi-instance implementation resource is capable of participating in an implementation (e.g., a secure and/or private implementation) of multiple virtual resources for multiple customers, it is called a multi-tenant implementation resource.

The virtual resource provider 206 may maintain a general implementation resource pool containing a significant portion of the implementation resources 218 that is the default implementation resource pool from which to allocate implementation resources 220-222 to satisfy virtual resource provisioning requests. Alternatively, or in addition, the virtual resource provider 206 may maintain one or more implementation resource pools containing different subsets of the implementation resources 218. For example, different implementation resource pools may be established for different customers and/or sets of customers. In at least one embodiment, particular implementation resource pools may be dedicated to particular customers (e.g., contain implementation resources that are not shared with other customers of the virtual resource provider 206). Particular implementation resource pools may be special purpose and/or contain implementation resources of particular types. Particular transition procedures may be associated with entry to and exit from particular implementation resource pools. In at least one embodiment, an implementation resource pool is an example of a colorable subset of the implementation resources 218 of the virtual resource provider 206.

Figure 3:
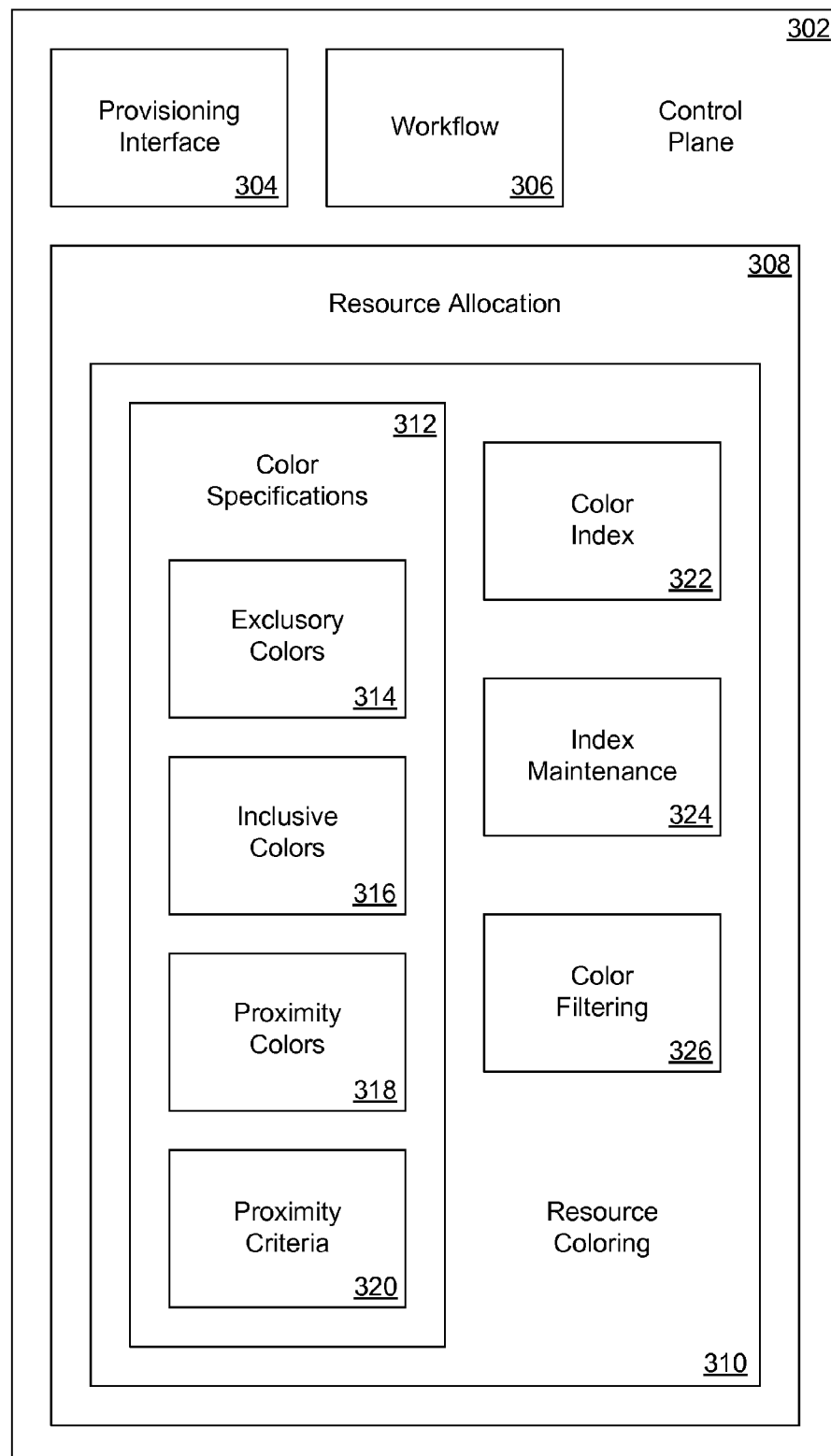
FIG. 3 is a schematic diagram depicting aspects of an example control plane in accordance with at least one embodiment.

Provisioning, configuration, re-configuration, and/or de-provisioning (collectively, "provisioning") of virtual resources may be controlled by the control plane 210 of the virtual resource provider 206. FIG. 3 depicts aspects of an example control plane 302 in accordance with at least one embodiment. The control plane 302 of FIG. 3 is an example of the control plane 210 of FIG. 2. The control plane 302 may include a provisioning interface 304 configured at least to receive virtual resource 212 provisioning requests from one or more of the clients 202-204, a workflow component 306 configured at least to guide responses to provisioning requests in accordance with one or more provisioning workflows, and a resource allocation component 308 configured at least to manage allocation of implementation resources 218 to virtual resources 212.

The provisioning interface 304 may include any suitable provisioning interface elements. Examples of suitable provisioning interface elements include interface elements that correspond to requests to provision the virtual resources 212 (FIG. 2), interface elements that provide access to virtual resource 212 configuration information, and one or more interface elements enabling authentication to establish authority for such provisioning-related operations. The provisioning interface 304 may incorporate and/or be incorporated in a user interface (UI) such as a graphical user interface (GUI), a Web-based interface, a programmatic interface such as an application programming interface (API) and/or a set of remote procedure calls (RPCs) corresponding to provisioning interface elements, a messaging interface such as a messaging interface in which the interface elements of the provisioning interface 304 correspond to messages of a communication protocol, and/or any suitable combination thereof. Web-based interfaces may include Web services interfaces such as Representational State Transfer (REST) compliant ("RESTful") Web services interfaces or Simple Object Access Protocol (SOAP) compliant Web services interfaces or other "non-RESTful" Web services interfaces.

In at least one embodiment, the provisioning interface 304 and the resource allocation component 308 may create, and/or cause the workflow component 306 to create, one or more workflows that are then maintained by the workflow component 306. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the resource allocation component 308.

The workflow component 306 may modify, further specify and/or further configure established workflows. For example, the workflow component 306 may select particular implementation resources 218 (FIG. 2) of the virtual resource provider 206 to execute and/or be assigned to particular tasks. Such selection may be based at least in part on the computing resource needs of the particular task as assessed by the workflow component 306. As another example, the workflow component 306 may add additional and/or duplicate tasks to an established workflow and/or reconfigure information flow between tasks in the established workflow. Such modification of established workflows may be based at least in part on an execution efficiency analysis by the workflow component 306. For example, some tasks may be efficiently performed in parallel, while other tasks depend on the successful completion of previous tasks.

As part of provisioning a virtual resource, the provisioning interface 304 and/or the workflow component 306 may request that the resource allocation component 308 determine the appropriate set of the implementation resources 218 (FIG. 2) required to implement the virtual resource, determine whether the required implementation resources are available and/or in accordance with virtual resource provider 206 allocation policies, and/or allocate the required implementation resources. The resource allocation component 308 may incorporate any suitable resource allocation and/or resource scheduling algorithm. Various aspects of such algorithms are well known to those of skill in art, so only some details are described herein. The resource allocation component 308 may include a resource coloring component 310 configured at least to establish and maintain resource color definitions and colors associations with respect to the virtual resources 212 and/or the implementation resources 218 of the virtual resource provider 206.

The resource coloring component 310 may include a color specifications component 312 configured at least to establish and maintain specifications and/or definitions (collectively, "specifications") of resource colors of a variety of types. The types of resource color maintained by the color specification component 312 may include resource color types corresponding to exclusory color specifications 314, inclusive color specifications 316, and proximity color specifications 318. Such specifications may include a name of a corresponding resource color, and a scope of the corresponding resource color. For example, a resource color name may correspond to a string of alphanumeric and/or Unicode characters or other suitable distinguishing resource color identifier. The resource color scope may correspond to a specification domain with respect to the virtual resource provider 206 (FIG. 2) within which the resource color identifier is required to be unique. Examples of resource color specification scopes include scoping to a customer or set of customers, scoping to an implementation resource pool or set of implementation resource pools, scoping to an implementation resource type or set of implementation resource types, and scoping to the virtual resource provider 206 as a whole.

Proximity color specifications 318 may be associated with one or more sets of proximity criteria specifications 320. For example, each proximity color defined by one of the proximity color specifications 318 may be associated with one of the sets of proximity criteria specifications 320. Proximity criteria may specify criteria for determining a proximity of implementation resources in the implementation resource network. For example, the proximity criteria may include a specification of a proximity metric based at least in part on communication connection capacity, communication connection bandwidth, and/or communication connection one-way or round-trip latency. Alternatively, or in addition, the proximity criteria may include one or more sets of proximity thresholds corresponding to proximity regions in the implementation resource network. Such proximity regions may corresponding to levels of oversubscription to communication connection resources in the implementation resource network. As another alternative, or further in addition, the proximity criteria may be based at least in part on oversubscription ratios with respect to communication connection resources. The specifications maintained by the color specification component 312 may be specified by an authorized user with the provisioning interface 304 and/or a suitable administrative interface (not shown in FIG. 3).

The resource coloring component 310 may further include a color index 322. The color index may track current associations between particular resource colors and particular sets of virtual resources 212 (FIG. 2) and/or implementation resources 218. For example, the color index 322 may track which of the implementation resources 220-222 are currently painted with particular resource colors. An index maintenance component 324 may maintain the color index 322 responsive to resource allocations by the resource allocation component 308 and/or updates to resource color specifications 314-318 and/or proximity criteria specifications 320. A color filtering component 326 may filter a set of candidate implementation resources (e.g., being considered by the resource allocation component 308) with respect to the resource color specifications 314-318 and/or proximity criteria specifications 320.

Figure 4:
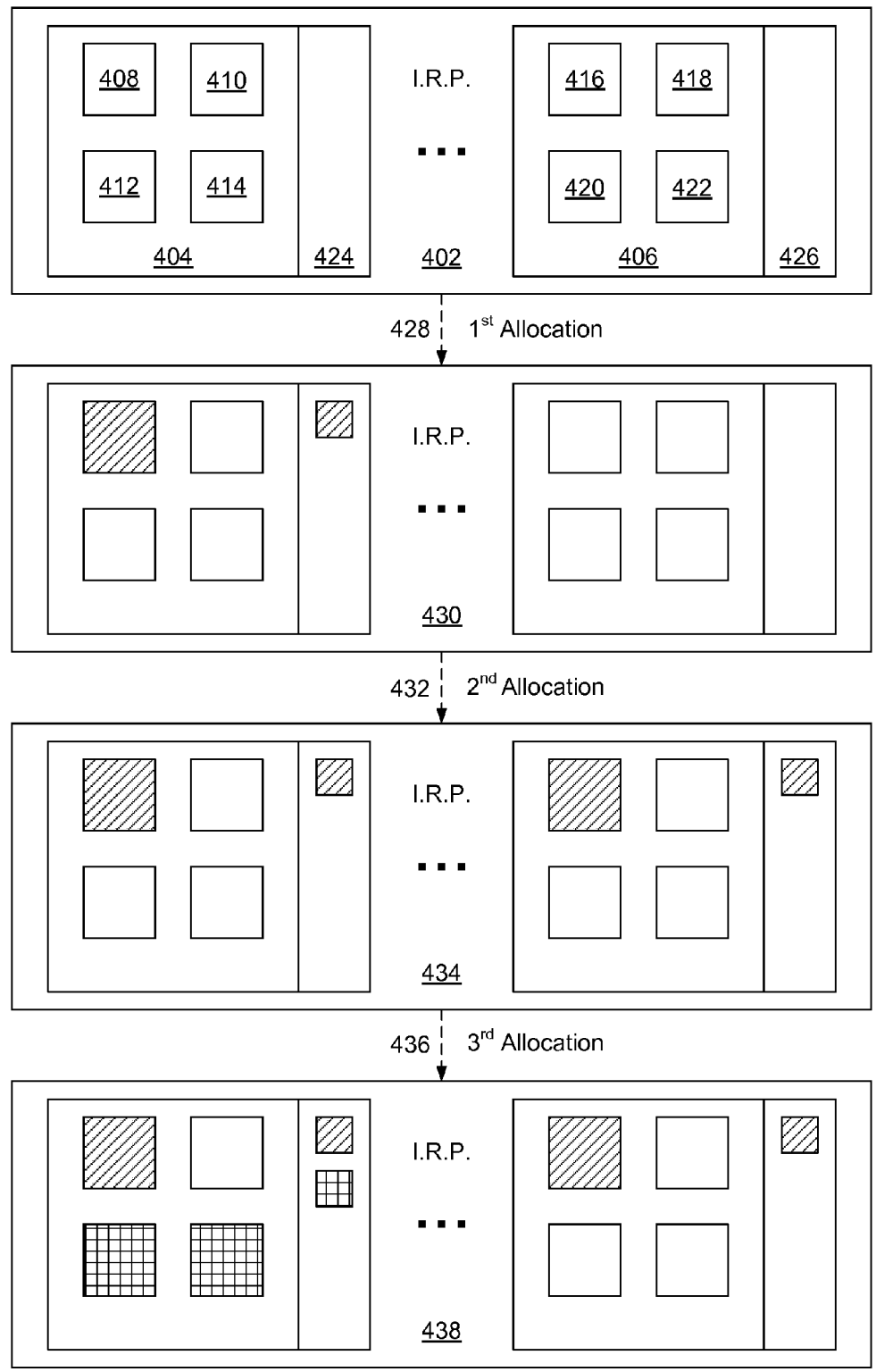
FIG. 4 is a schematic diagram depicting aspects of an example resource allocation that respects exclusory colors in accordance with at least one embodiment.

As described above, different types of resource color can correspond to different treatments during resource allocation. FIG. 4 depicts aspects of an example resource allocation that respects exclusory colors in accordance with at least one embodiment. An implementation resource pool (I.R.P.) 402 includes multiple implementation resources 404-406. For example, the implementation resource pool 402 may correspond to a set of VCS servers dedicated to a particular customer of the virtual resource provider 206 (FIG. 2). The implementation resources 404-406 of the implementation resource pool 402 are multi-instance implementation resources, each capable of supporting multiple allocation units 408-414 and 416-422, respectively. For example, each allocation unit 408-422 may correspond to a capacity to implement a "small" type virtual computer system.

FIG. 4 further depicts resource coloring data 424-426 associated with each implementation resource 404-406. The resource coloring data 424-426 may indicate a set of resource colors with which each implementation resource 404-406 is painted. Such resource color data 424-426 may be maintained at the implementation resources 220-222 (FIG. 2) and/or at the color index 322 (FIG. 3) of the resource coloring component 310. In this example, the implementation resources 404-406 begin without a resource color association (i.e., they are "uncolored" or have "no color").

At a first time $t_1$, a first allocation 428 occurs, for example, in response to a provisioning request by a user associated with the particular customer. The depicted implementation resource pool 430 is the implementation resource pool 402 following the first allocation 428. For clarity, same reference numerals are used for the features 404-426 of the implementation resource pool at both times 402, 430. The first allocation 428 requires selection of a single allocation unit from the implementation resource pool 402 and is associated with an exclusory color "diagonal stripe" (e.g., defined with one of the exclusory color specifications 314 of FIG. 3). Since the implementation resources 404-406 begin without a resource color association, the exclusory color association does not constrain the allocation, and the resource allocation component 308 selects the implementation resource 404 to provide the required allocation unit 408.

In the depiction of the implementation resource pool 430 after the allocation 428, allocation unit 408 is shaded with a diagonal stripe to indicate that it has been allocated to implementing a virtual resource associated with that color. In addition, the resource color data 424 of the implementation resource 404 has been updated to indicate that the implementation resource 404 has now been painted with the exclusory color "diagonal stripe".

At a second time $t_2$, a second allocation 432 occurs, for example, in response to a second similar provisioning request by the user associated with the particular customer. Again, the depicted implementation resource pool 434 corresponds to a state of the implementation resource pool 402, now after the second allocation 432. The second allocation 432 again requires selection of a single allocation unit from the implementation resource pool 402 and is associated with the exclusory color "diagonal stripe". Since the implementation resource 404 is now painted with the exclusory color "diagonal stripe" as indicated by the resource color data 424, the implementation resource 404 is excluded from consideration for selection (i.e., is filtered out). Instead, the implementation resource 406 having no color association is selected to provide the required allocation unit 416.

In the depiction of the implementation resource pool 434 after the second allocation 432, the implementation resource 404 is unchanged, but the allocation unit 416 of the implementation resource 406 is now shaded with the diagonal stripe to indicate that it has been allocated to implementing a virtual resource associated with that color. In addition, the resource color data 426 of the implementation resource 406 has been updated to indicate that the implementation resource 406 has now also been painted with the exclusory color "diagonal stripe".

A third allocation 436 occurs at a third time $t_3$. In this example, the third allocation 436 occurs in response to a provisioning request by a different user associated with the particular customer. Furthermore, this provisioning request is for a "medium" type virtual computer system and is associated with a different exclusory color "grid lines". Again the depicted implementation resource pool 438 corresponds to the state of the implementation resource pool 402, now following the third allocation 436. Although the implementation resources 404, 406 are painted with the exclusory color "diagonal stripe", the implementation resources 404, 406 are not currently (i.e., prior to allocation 436) painted with the exclusory color "grid lines", and so are not excluded from consideration by the resource allocation component 308 (FIG. 3). In this example, the "medium" type virtual computer system requires two allocation units, and the resource allocation component 308 selects implementation resource 404 to provide both allocation units 412, 414.

In the depiction of the implementation resource pool 438 after the third allocation 436, allocation units 412 and 414 of the implementation resource 404 are shaded with a grid line pattern to indicate that they have been allocated to implementation a virtual resource associated with the exclusory color "grid lines". In addition, the resource color data 424 of the implementation resource 424 has been updated to indicate that the implementation resource 404 has now also been painted with the exclusory color "grid lines". Although each of the implementation resources 404-406 have associated resource color data 424-426 and are thus colorable, in at least one embodiment, a subset of the implementation resources 218 are not so colorable.

Figure 5:
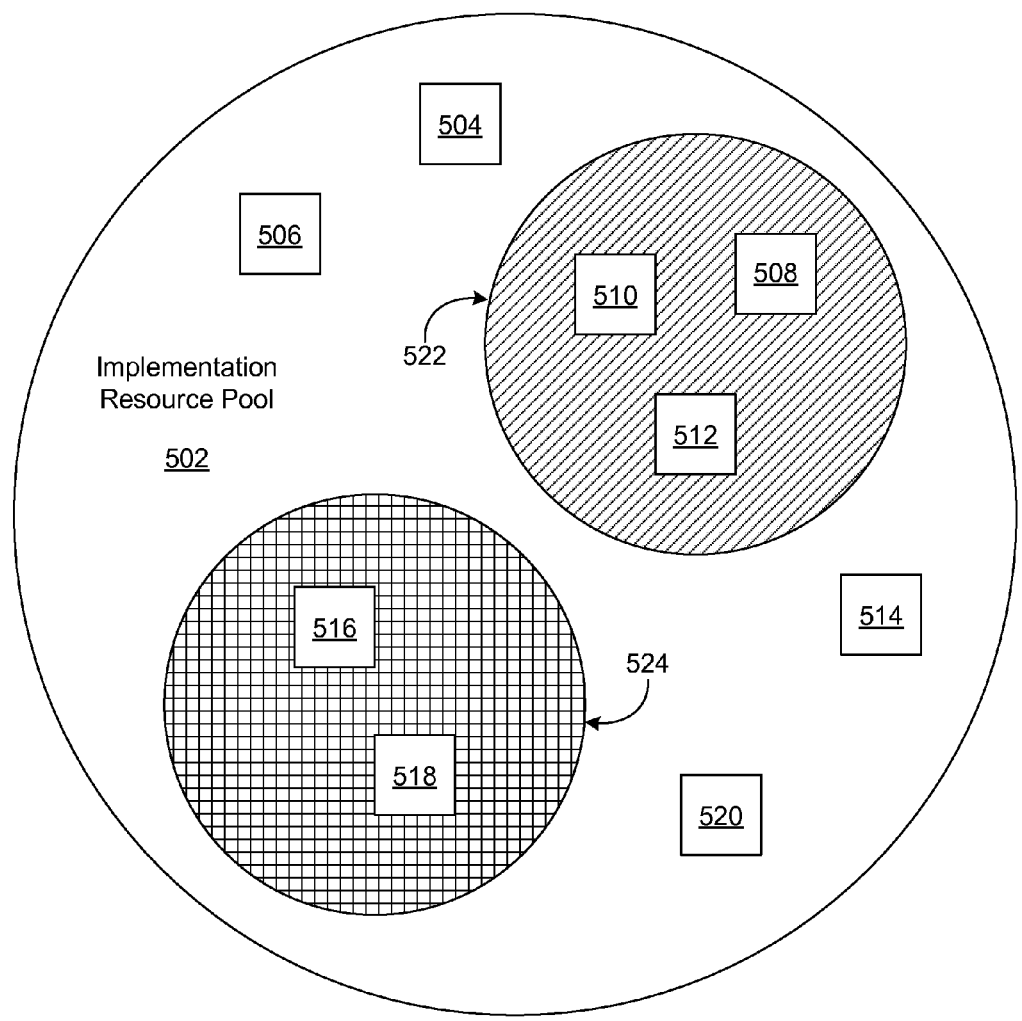
FIG. 5 is a schematic diagram depicting aspects of an example resource allocation that respects inclusive colors in accordance with at least one embodiment.

Virtual resources 212 (FIG. 2) and/or implementation resources 218 associated with inclusive colors may be treated differently than those associated with exclusory colors. FIG. 5 depicts aspects of an example resource allocation that respects inclusive colors in accordance with at least one embodiment. In the example depicted in FIG. 5, an implementation resource pool 502 includes multiple implementation resources 504-520. A first subset 508-512 of the implementation resource pool 502 has been painted with a first inclusive color 522, and a second subset 516-518 has been painted with a second inclusive color 524.

For example, the implementation resource pool 502 may provide implementation resources of different types to implement virtual resources that, in turn, provide a service with a varying load. Different implementation resources 504-520 may be associated with different costs and/or capacities. For example, the first inclusive color 522 may designate low cost implementation resources 508-512, and the second inclusive color 524 may designate high capacity implementation resources 516-518.

Suppose a user having access to the implementation resource pool 502 requests provisioning of a first virtual resource associated with the first inclusive color 522. The resource allocation component 308 (FIG. 3) may be configured by the resource coloring component 310 to required and/or prefer selection of allocation units at the implementation resources 508-512. A different request for a second virtual resource associated with the second inclusive color 524 may require and/or prefer implementation resources 516-518.

Figure 6:
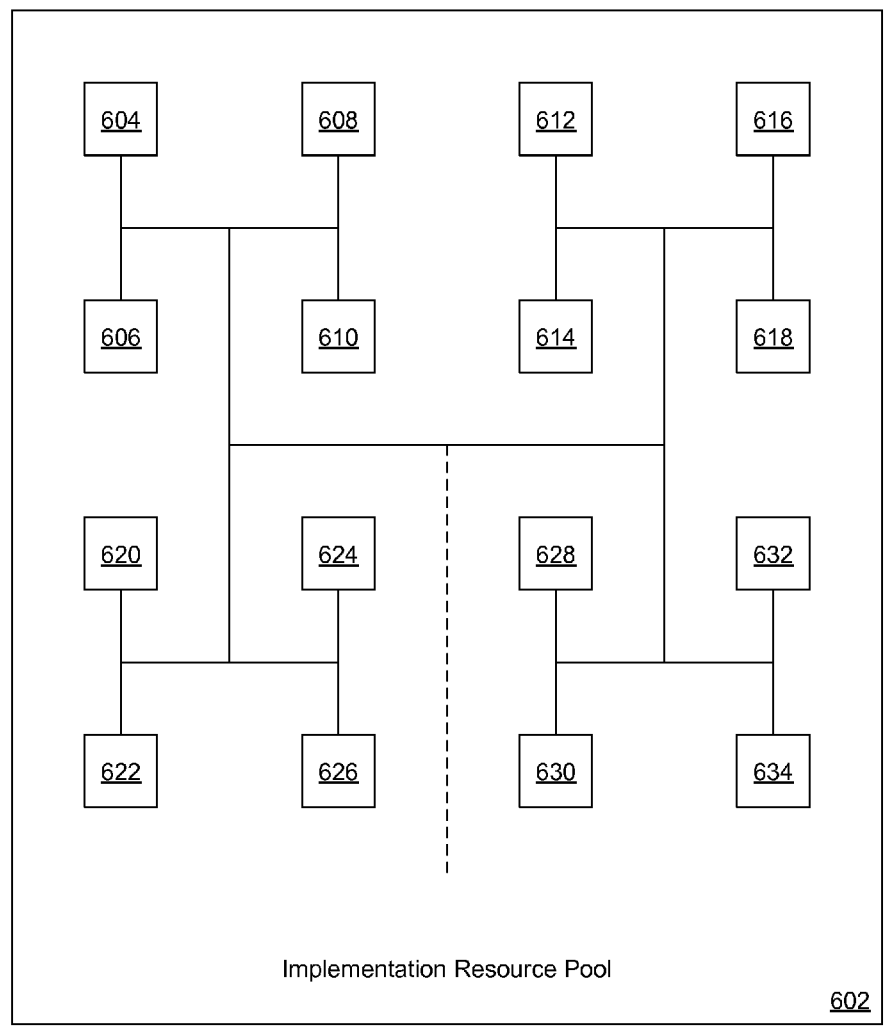
FIG. 6 is a schematic diagram depicting aspects of an example implementation resource network in accordance with at least one embodiment.

In at least one embodiment, the association of inclusive colors with implementation resources requires minimally that the implementation resources be colorable. In contrast, proximity colors indicate subsets of the implementation resources 218 (FIG. 2) that are related by an underlying structure of the virtual resource provider 206. FIG. 6 depicts aspects of an example implementation resource network in accordance with at least one embodiment. In the example depicted in FIG. 6, an implementation resource pool 602 contains implementation resources 604-634 interconnected as follows: implementation resources 604-606, 608-610, 612-614, 616-618, 620-622, 624-626, 628-630 and 632-634 are directly connected as pairs, then pairs 604-610, 612-618, 620-626 and 628-634 are directly connected, sets of four 604-610 and 620-626, and 612-618 and 628-634 are directly connected, and sets of eight 604-610, 620-626 and 612-618, 628-634 are directly connected.

Suppose the initial pairings such as 604 and 606 are connected with a high capacity, low latency communication connection. In such a case, the pairs may be considered proximate with respect to one or more of the specified proximity criteria 320 (FIG. 3). Whether pairs 604-606 and 608-610 are considered proximate by the resource coloring component 310 may depend on the specified proximity criteria 320. This is also true, for example, for pairs 604-606 and 632-634.

As a further allocation example, suppose the implementation resources 604-634 begin without a color association, and a user having access to the implementation resource pool 602 requests that a virtual resource associated with a proximity color "blue" be provisioned. Since none of the implementation resources 604-634 are yet associated with a proximity color, the resource allocation component 308 (FIG. 3) does not particularly require and/or prefer any of the implementation resources 604-634, and may select, for example, implementation resource 610. In at least one embodiment, in addition to painting colorable implementation resource 610 with the proximity color "blue", the resource coloring component 310 may determine which of the implementation resources 604-608, 612-634 satisfy the proximity criteria 320 associated with the proximity color "blue". For example, it may be that implementation resources 604-608 are within "blue" proximity, and may be so painted (e.g., the color index 322 may be updated). Alternatively, the search for proximate implementation resources may be delayed until the next provisioning request.

For example, suppose further that the user later requests another virtual resource associated with the proximity color "blue". In this example, at least implementation resource 610 is painted with proximity color "blue". In addition, implementation resources 604-608 have been determined and/or is then determined to be within "blue" proximity of implementation resource 610. Accordingly, the resource allocation component 308 (FIG. 3) may select the appropriate allocation units from the implementation resources 604-610. Selection of one of the implementation resources 604-608 other than the implementation resource 610 may or may not change the subset of the implementation resource pool 602 within the "blue" neighborhood, depending on the associated proximity criteria 320.

Figure 7:
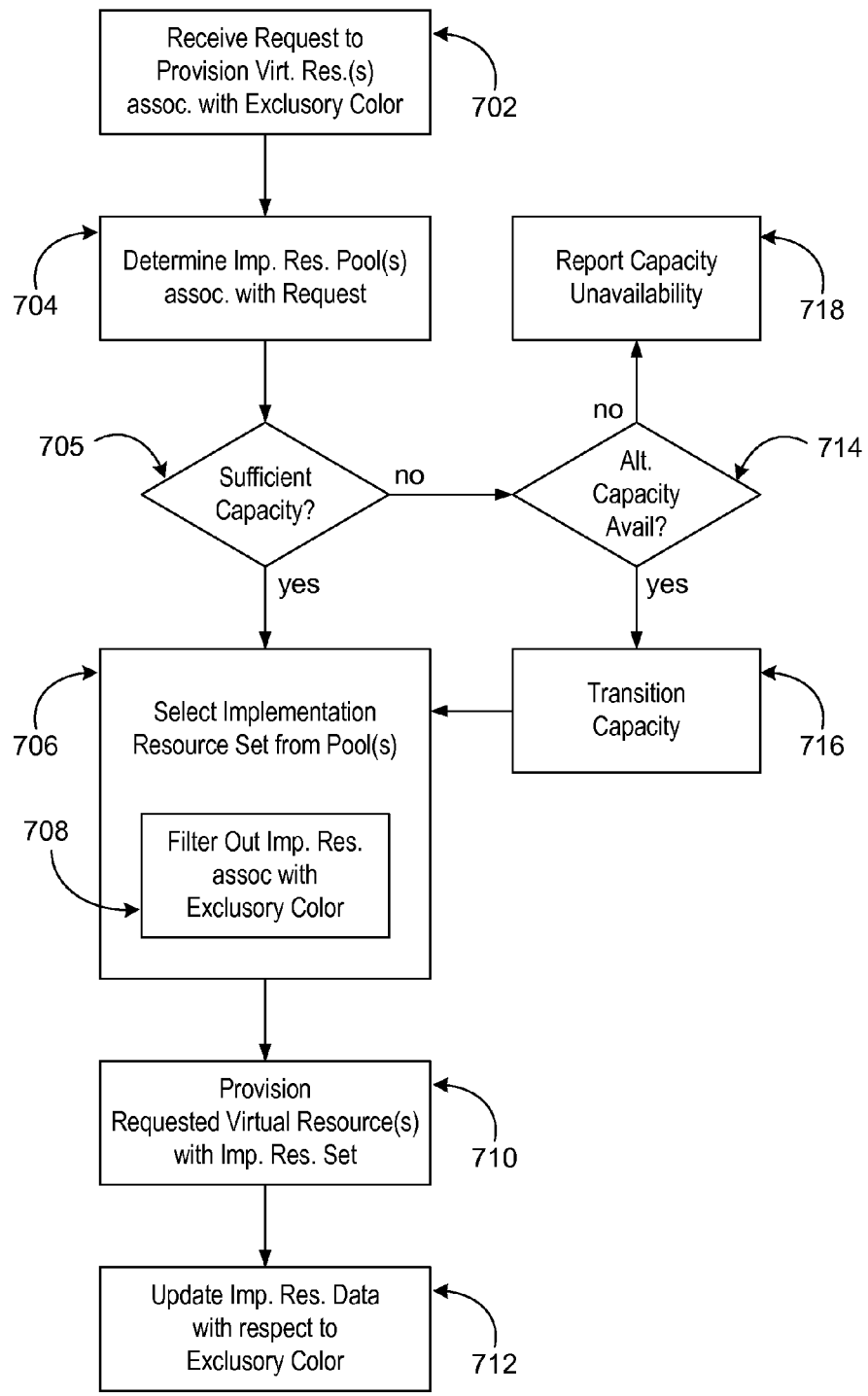
FIG. 7 is a flowchart depicting example steps for virtual provisioning with an exclusory color in accordance with at least one embodiment.

The description now turns to example steps and/or procedures that may be performed in accordance with at least one embodiment. FIG. 7 depicts example steps for virtual provisioning with an exclusory color in accordance with at least one embodiment. At step 702, a request may be received to provision one or more virtual resources associated with an exclusory color. For example, an authorized user may interact with the provisioning interface 304 (FIG. 3) to specify the exclusory color and associate the exclusory color with the provisioning request. At step 704, one or more implementation resource pools may be determined to be associated with the provisioning request. For example, a workflow may determine the implementation resource pool(s) available to the user making the provisioning request.

At step 705, it may be determined whether the associated implementation resource pool(s) determined at step 704 include implementation resources with sufficient capacity to implement the requested virtual resource(s) given the current set of implementation resource allocation constraints including the constraint(s) imposed by the exclusory color. For example, the resource allocation component 308 (FIG. 3) may determine the sufficiency based at least in part on the implementation resource requirements of the requested virtual resource(s) and the implementation resources in the associated implementation resource pool(s) painted with the exclusory color. If the associated implementation resource pool(s) currently include sufficient capacity, a procedure incorporating step 705 may progress to step 706. Otherwise, the procedure may progress to step 714. At step 714, it may be determined whether additional capacity is available in one or more alternate implementation resource pools. For example, the resource allocation component 308 may search the general implementation resource pool for the additional capacity. If the additional capacity is available, the procedure may progress to step 716. Otherwise, the procedure may progress to step 718. At step 716, sufficient implementation resource capacity to meet the requirements of the requested virtual resource(s) may be transitioned from the alternate implementation resource pool(s) to the associated implementation resource pool(s) determined at step 704. For example, the resource allocation component 308 may transition the additional implementation resource capacity in accordance with one or more configured implementation resource pool transition procedures. At step 718, the current unavailability of additional capacity determined at step 714 may be reported, for example, in a response to the request of step 702.

The current set of implementation resource allocation constraints may include that the associated implementation resource pool(s) contain implementation resources dedicated to one or more customers of the virtual resource provider 206 (FIG. 2). In such a case, step 705 may make a determination of insufficient capacity because the implementation resources in the associated implementation resource pool(s) are dedicated to one or more customers of the virtual resource provider 206 other than the customer associated with the provisioning request of step 702. If step 714 discovers alternate capacity, step 716 may transition sufficient capacity to an implementation resource pool to which the requesting customer has access. Step 718 may correspond to, or be incorporated in, a "request denied" response to the request of step 702. In at least one embodiment, steps 705, 714, 716, 718, and corresponding steps described below with reference to FIGS. 8 and 9, implement, at least in part, a dynamic implementation resource pool management capability of the resource allocation component 308 (FIG. 3).

At step 706, a set of implementation resources may be selected from the associated implementation resource pool(s). For example, the resource allocation component 308 (FIG. 3) may identify a set of candidate implementation resources in the associated implementation resource pool(s). As part of step 706, at step 708, a set of implementation resources associated with the exclusory color may be filtered out. For example, the color filtering component 326 of the resource coloring component 310 may filter out the candidate implementation resources currently painted with the exclusory color. The filtering may be "hard" so that step 706 can fail if sufficient candidate implementation resources of the appropriate type cannot be found, or "soft" so that step 706 is permitted to search for alternate candidates painted with the exclusory color if the step would otherwise fail. Such soft filtering may include determination of one or more suitability scores for the alternate candidates, and preferring selection of alternate candidates with more optimal scores. Such suitability scores may be based at least in part on a degree to which an alternate candidate is "overloaded" with respect to the exclusory color, as well as a set of relative or absolute thresholds with respect to such overloading. At step 710, the requested virtual resource(s) may be provisioned with a selected subset of the candidate implementation resources determined at step 706 and/or 708.

At step 712, implementation resource data relating to exclusory color may be updated. For example, the index maintenance component 324 (FIG. 3) may update the color index 322 based at least in part on the implementation resources selected at step 710 to provision the virtual resource(s). This step may correspond to updating the resource coloring data 424-426 as described above with reference to FIG. 4. In at least one embodiment, a particular multi-instance implementation resource is not painted with the exclusory color unless the number of allocation units allocated to virtual resources associated with the exclusory color exceeds a threshold (e.g., greater than one). Alternatively, the implementation resource data relating to the exclusory color may include one or more counts corresponding to the number of allocation units allocated to particular exclusory colors, and the filtering of step 708 may require the count to be above the threshold value before filtering out the corresponding implementation resource.

Figure 8:
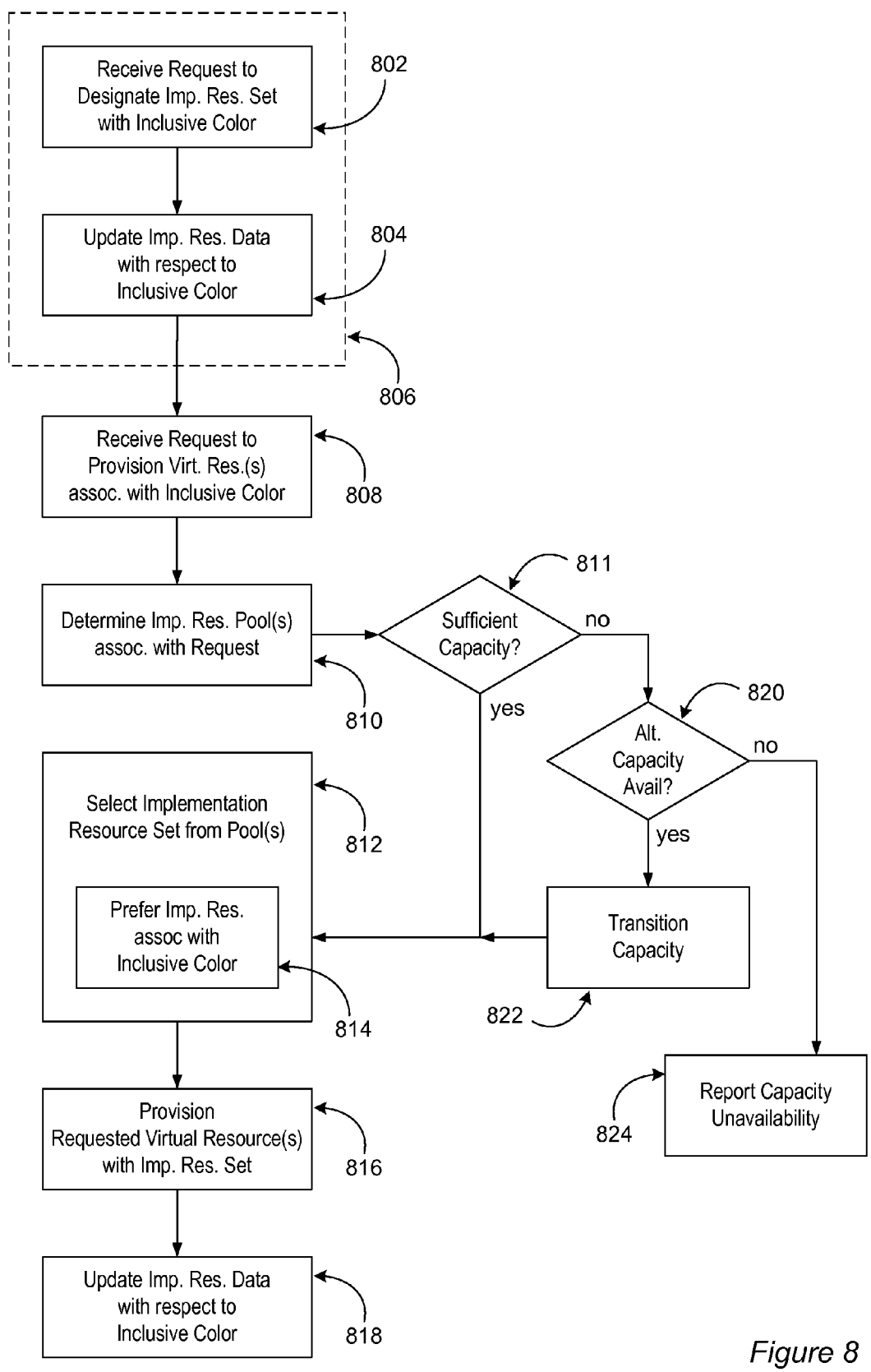
FIG. 8 is a flowchart depicting example steps for virtual provisioning with an inclusive color in accordance with at least one embodiment.

FIG. 8 depicts example steps for virtual provisioning with an inclusive color in accordance with at least one embodiment. At step 802, a request may be received to designate a set of implementation resources 218 (FIG. 2) as associated with an inclusive color. For example, a user of the virtual resource provider 206 may interact with the provisioning interface 304 (FIG. 3) to add a corresponding inclusive color specification to the specifications 316. At step 804, implementation resource data relating to inclusive color may be updated. For example, the index maintenance component 324 may update the color index 322 to paint the specified set of implementation resources with the specified inclusive color. In FIG. 8, the steps 802 and 804 are shown surrounded by dashed line 806 to indicate that the steps 802 and 804 may occur during a preparatory and/or administrative phase removed in time from the following steps. Alternatively, or in addition, steps 802 and 804 may be omitted and/or incorporated into other steps depicted in FIG. 8. For example, the virtual resource provisioning request of step 808 may also serve as and/or incorporate the inclusive color designation request of step 802, and the implementation resource data update of step 804 may occur at step 818 following successful provisioning of the requested virtual resources.

At step 808, a request may be received to provision one or more virtual resources associated with the inclusive color. For example, an authorized user (possibly different from the user of step 802) may interact with the provisioning interface 304 (FIG. 3) to request the virtual resource(s) and associate the provisioning request with the inclusive color. At step 810, one or more implementation resource pools may be determined to be associated with the provisioning request, for example, as described above with reference to FIG. 7. At step 811, it may be determined whether the associated implementation resource pool(s) determined at step 810 include implementation resources with sufficient capacity to implement the requested virtual resource(s) given the current set of implementation resource allocation constraints including the constraint(s) imposed by the inclusive color. For example, the resource allocation component 308 (FIG. 3) may determine the sufficiency based at least in part on the implementation resource requirements of the requested virtual resource(s) and the implementation resources in the associated implementation resource pool(s) painted with the inclusive color. If the associated implementation resource pool(s) currently include sufficient capacity, a procedure incorporating step 811 may progress to step 812. Otherwise, the procedure may progress to step 820 and attempt to transition additional resources into the associated implementation resource pool(s). Steps 820, 822 and 824 correspond to steps 714, 716 and 718, respectively, described above with reference to FIG. 7.

At step 812, a set of implementation resources may be selected from the associated implementation resource pool(s). For example, the resource allocation component 308 (FIG. 3) may identify a set of candidate implementation resources in the associated implementation resource pool(s). As part of step 812, at step 814, the set of candidate implementation resources may be refined to prefer implementation resources painted with the inclusive color. For example, the color filtering component 326 of the resource coloring component 310 may refine the candidate implementation resources to prefer those currently painted with the inclusive color. The refinement and/or filtering may be "hard" so that step 812 can fail if sufficient candidate implementation resources of the appropriate type and painted with the inclusive color cannot be found, or "soft" so that step 812 is permitted to include alternate candidates not painted with the inclusive color if the step would otherwise fail. At step 816, the requested virtual resource(s) may be provisioned with the candidate implementation resources selected at step 812 and/or 814, or with a selected subset thereof.

Figure 9:
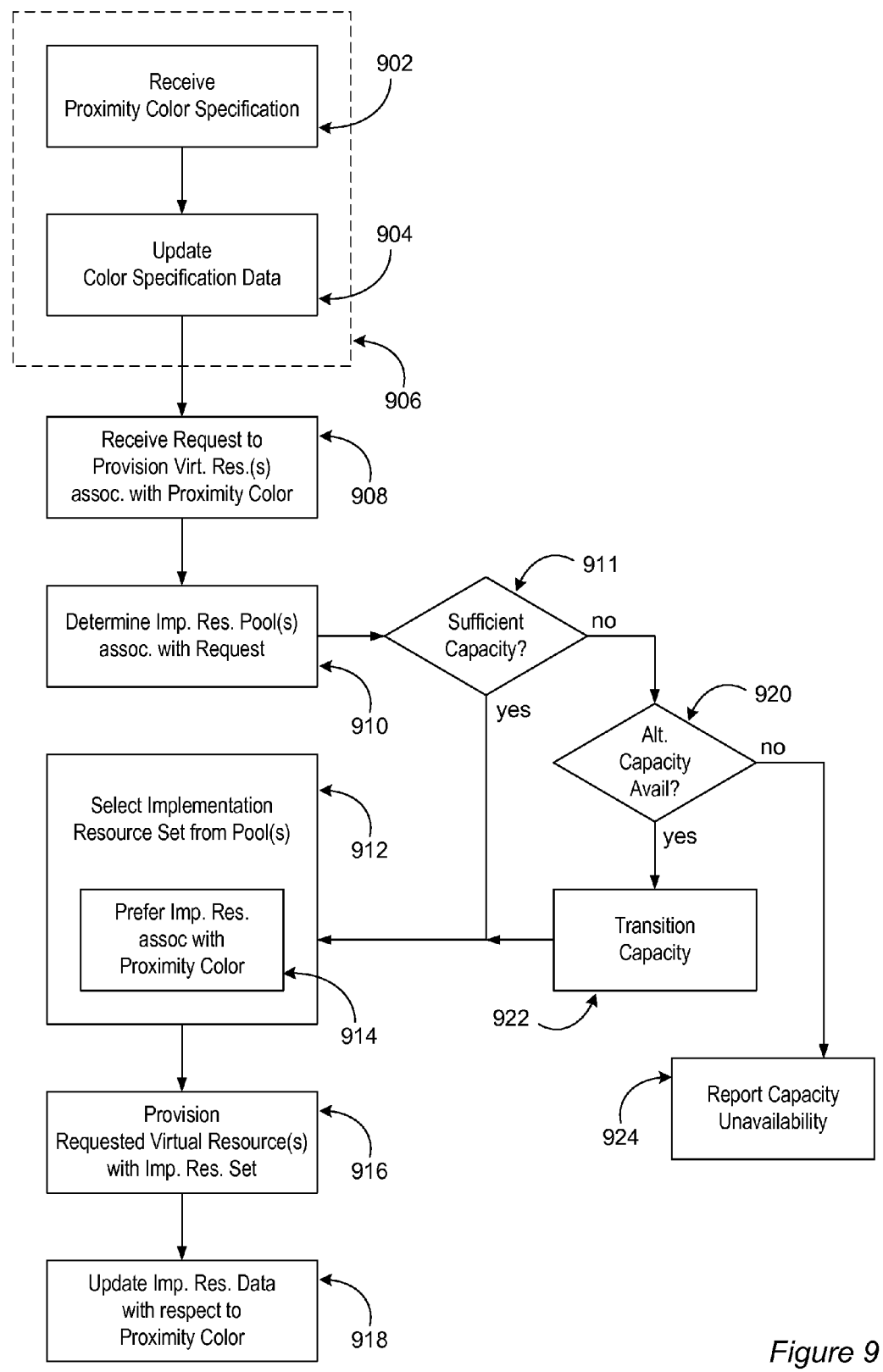
FIG. 9 is a flowchart depicting example steps for virtual provisioning with a proximity color in accordance with at least one embodiment.

FIG. 9 depicts example steps for virtual provisioning with a proximity color in accordance with at least one embodiment. At step 902, a proximity color specification may be received. For example, a user of the virtual resource provider 206 (FIG. 2) may interact with the provisioning interface 304 (FIG. 3) to specify a proximity color including a set of proximity criteria. At step 904, proximity color specification data may be updated. For example, the provisioning interface 304 and/or the workflow component 306 may interact with the resource coloring component 310 to update the proximity color specifications 318 and/or the proximity criteria specifications 320. In FIG. 9, the steps 902 and 904 are shown surrounded by dashed line 906 to indicate that the steps 902 and 904 may occur during a preparatory and/or administrative phase removed in time from the following steps.

At step 908, a request may be received to provision one or more virtual resources associated with the proximity color. For example, an authorized user (possibly different from the user of step 902) may interact with the provisioning interface 304 (FIG. 3) to request the virtual resource(s) and associate the provisioning request with the proximity color. At step 910, one or more implementation resource pools may be determined to be associated with the provisioning request, for example, as described above with reference to FIG. 7. At step 911, it may be determined whether the associated implementation resource pool(s) determined at step 910 include implementation resources with sufficient capacity to implement the requested virtual resource(s) given the current set of implementation resource allocation constraints including the constraint(s) imposed by the proximity color. For example, the resource allocation component 308 (FIG. 3) may determine the sufficiency based at least in part on the implementation resource requirements of the requested virtual resource(s) and the implementation resources in the associated implementation resource pool(s) painted with the proximity color. If the associated implementation resource pool(s) currently include sufficient capacity, a procedure incorporating step 911 may progress to step 912. Otherwise, the procedure may progress to step 920 and attempt to transition additional resources into the associated implementation resource pool(s). Steps 920, 922 and 924 correspond to steps 714, 716 and 718, respectively, described above with reference to FIG. 7.

At step 912, a set of implementation resources may be selected from the associated implementation resource pool(s). For example, the resource allocation component 308 (FIG. 3) may identify a set of candidate implementation resources in the associated implementation resource pool(s). As part of step 912, at step 914, the set of candidate implementation resources may be refined to prefer implementation resources painted with the proximity color. For example, the color filtering component 326 of the resource coloring component 310 may refine the candidate implementation resources to prefer those currently painted with the proximity color. The refinement and/or filtering may be "hard" so that step 912 can fail if sufficient candidate implementation resources of the appropriate type and painted with the proximity color cannot be found, or "soft" so that step 912 is permitted to include alternate candidates not painted with the proximity color if the step would otherwise fail. At step 916, the requested virtual resource(s) may be provisioned with the candidate implementation resources selected at step 912 and/or 914, or with a selected subset thereof.

At step 918, implementation resource data relating to proximity color may be updated. For example, the index maintenance component 324 (FIG. 3) may update the color index 322 based at least in part on the implementation resources selected at step 916 to provision the virtual resource(s) and/or the proximity criteria associated with the proximity color as described above with reference to FIG. 6. In at least one embodiment, the updating of step 918 may be partially or wholly incorporated into step 914 as part of the refinement and/or filtering process.

Figure 10:
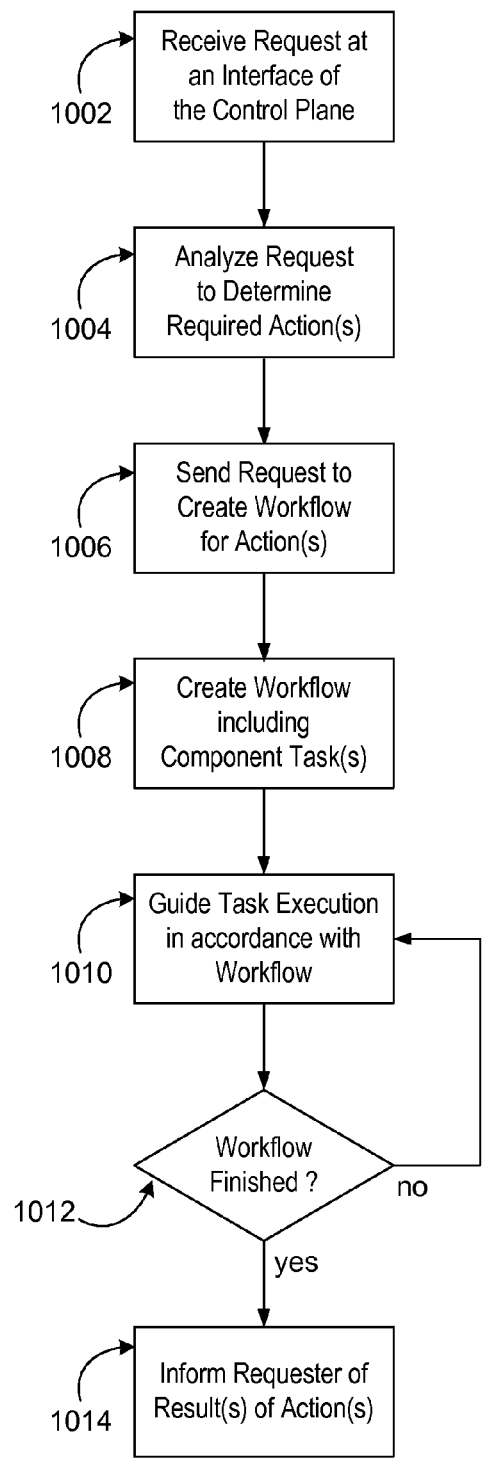
FIG. 10 is a flowchart depicting example steps for workflow management in accordance with at least one embodiment.

As described above with reference to FIG. 3, the control plane 302 may be facilitated by one or more workflows maintained by the workflow component 306. FIG. 10 depicts example steps for workflow management in accordance with at least one embodiment. At step 1002, a request may be received by an interface of the control plane 302 (FIG. 3). For example, one of the user interfaces of the control plane 302 may receive the request from a user, customer and/or administrator of the virtual resource provider 206 (FIG. 2). The request may be a call to a programmatic interface such as an application programming interface (API) and/or a Web services interface. Alternatively, or in addition, the request may be received through a graphical user interface (GUI) such as a Web-based GUI. At step 1004, the request may be analyzed to determine one or more actions required to successfully complete the request. For example, the provisioning interface 304 may analyze the request, and determine a set of actions required to provision a set of virtual resources 212. When an interface element receiving the request corresponds to a specific action to be performed, the interface may extract information from the request to be utilized in determining aspects and/or parameters of the action to be performed.

At step 1006, a request may be sent to create a workflow based at least in part on the one or more actions determined at step 1004. For example, provisioning interface 304 (FIG. 3) may send the request to the workflow component 306. The request to create the workflow may include the action(s), action metadata such as type of action, and/or action parameters. In at least one embodiment, the control plane 302 and/or the workflow component 306 maintains a job queue for such requests, and workflows are created responsive to new additions to the job queue. At step 1008, a workflow and one or more component tasks may be created. For example, the workflow component 306 may analyze the request of step 1006 to determine the appropriate workflow and component tasks to create.

At step 1010, execution of the component task(s) may be guided in accordance with the workflow. For example, the workflow component 306 (FIG. 3) may activate elements of interfaces of various implementation resources to provision the set of virtual resources. Alternatively, or in addition, the workflow component 306 may manage bids for execution of the component task(s) by components of the virtual resource provider 206 (FIG. 2). At step 1012, it may be determined whether the workflow has finished. For example, the workflow component 306 may determine whether a final task in a sequence of tasks managed by the workflow has completed. If so, a procedure incorporating step 1012 may progress to step 1014. Otherwise the procedure may return to step 1010 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 1014, the sender of the request of step 1002 may be informed of result(s) of the action(s).

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for virtual resource provisioning, comprising:
   under control of one or more computer systems configured with executable instructions,
      receiving, from a client device associated with a user, a request to provision a virtual machine on a server on behalf of the user, the request including at least an association between the requested virtual machine and an exclusory color, wherein provisioning the virtual machine includes selecting the server from a pool of servers and launching the requested virtual machine on the selected server, the exclusory color labeling the requested virtual machine;
      determining a set of potential servers, from the pool of servers, for hosting the requested virtual machine, the determination based at least in part on filtering out at least one server of the one or more pool of servers labeled with the exclusory color;
      provisioning the requested virtual machine with a particular server of the set of potential servers; and
      updating at least one data structure corresponding to the set of potential servers to at least label the set of potential servers with the exclusory color, wherein labeling the set of potential servers with the exclusory color enables a preference that at least a second virtual machine associated with the exclusory color be provisioned using a second set of potential servers not labeled with the exclusory color.

2. A computer-implemented method according to claim 1, wherein the exclusory color corresponds to a string of alphanumeric characters.

3. A computer-implemented method according to claim 1, wherein the set of potential servers comprises at least one multi-tenant server configured to implement, at least in part, a plurality of virtual machines controlled by a plurality of customers of a virtual resource provider.

4. A computer-implemented method according to claim 1, wherein the pool of servers comprises at least one multi-tenant server dedicated to implementing virtual machines of one of a plurality of customers of a virtual resource provider.

5. A computer-implemented method according to claim 1, wherein the filtering with respect to the exclusory color reduces a chance of failure of a set of virtual machines including the requested virtual machine.

6. A computer-implemented method according to claim 1, wherein the set of potential servers comprises at least one multi-tenant server and the filtering with respect to the exclusory color increases a utilization efficiency of said at least one multi-tenant server.

7. A computer-implemented method according to claim 1, wherein updating said at least one data structure comprises updating a count associated with the exclusory color and the filtering comprises filtering out at least one of the pool of servers associated with the exclusory color for which the corresponding count is at least a threshold value.

8. A computer-implemented method according to claim 1, wherein the pool of servers is available to a the user, the user being associated with a customer of a virtual resource provider, and the filtering comprises filtering out at least one of the servers associated with the exclusory color and the customer.

9. A computer-implemented method according to claim 1, wherein the pool of servers comprises at least one of: a physical server, a server rack, a physical portion of a data center configured to be tolerant to component failure in another physical portion of the data, the data center as a whole, a mobile data center, a network switch, a network connection, a wireless network transmitter, or a wireless network receiver.

10. A computer-implemented method according to claim 1, wherein the pool of servers comprises at least one of: a storage device, a physical processing unit, a core of a multi-core processor, a cache of a multi-core processor, a physical memory module, a random access memory (RAM) module, or a RAM chip of a multi-chip memory module.

11. A computer-implemented method according to claim 1, wherein said at least one data structure corresponds to at least one colorable risk domain that includes the pool of servers, the at least one colorable risk domain capable of being labeled with the exclusory color.

12. A computer-implemented method according to claim 11, wherein said at least one colorable risk domain corresponds to at least one of: a geographical region, an earthquake risk zone, or a flood risk zone.

13. A computer-implemented method according to claim 11, wherein said at least one colorable risk domain corresponds to at least one of: a political boundary, a regulatory boundary, or an organizational boundary.

14. A computer-implemented method according to claim 11, wherein said at least one colorable risk domain corresponds to at least one of a plurality of virtual resource providers.

15. A computer-implemented method for virtual resource provisioning, comprising:
  under control of one or more computer systems configured with executable instructions, receiving a first request, from a first user associated with a first customer of a virtual resource provider, to provision a virtual resource with an implementation resource on behalf of the first user, the first request including at least an association between the requested virtual resource and an inclusive color, wherein provisioning the virtual resource includes selecting the implementation resource from an implementation resource pool and launching the requested virtual resource on the selected implementation resource, the inclusive color labeling the requested virtual resource;
  determining a first set of potential implementation resources, from the implementation resource pool, for implementing the requested virtual resource, the determination based at least in part on selecting at least one of the implementation resources of the implementation resource pool that are available to the first customer, the selecting configured at least to designate the at least one of the implementation resources labeled with the inclusive color for provisioning with a higher priority than that of another of the implementation resources not labeled with the inclusive color;
  provisioning the requested virtual resource with a particular implementation resource of the first set of potential implementation resources; and
  updating at least one data structure corresponding to the first set of potential implementation resources to at least label the first set of potential implementation resources with the inclusive color, wherein labeling the first set of potential implementation resources with the inclusive color enables a preference that at least a second virtual resource associated with the inclusive color be provisioned using a second set of potential implementation resources labeled with the inclusive color.

16. A computer-implemented method according to claim 15, further comprising:
  receiving a second request from a second user associated with a second customer of the virtual resource provider, the second request to provision the second virtual resource associated with the inclusive color;
  determining the second set of potential implementation resources, from the implementation resource pool, for implementing the requested second virtual resource, the determination based at least in part on selecting at least one of the implementation resources associated with the inclusive color from the implementation resource pool available to the second customer; and
  provisioning the requested second virtual resource with the second set of potential implementation resources.

17. A computer-implemented method according to claim 16, wherein the implementation resources designated as having the inclusive color comprises at least one multi-tenant implementation resource, and the selecting with respect to the inclusive color increases a utilization efficiency of the at least one multi-tenant implementation resource with respect to the first customer and the second customer.

18. A computer-implemented method according to claim 15, further comprising:
  receiving a second request from a second user associated with a second customer of the virtual resource provider, the second request to provision the second virtual resource associated with the inclusive color;
  determining that provisioning the second virtual resource requires at least one of the implementation resources associated with the inclusive color in at least one implementation resource pool that is not available to the second customer; and
  denying the second request.

19. A computer-implemented method for virtual resource provisioning, comprising:
  under control of one or more computer systems configured with executable instructions,
    receiving, from a client, a request to provision a virtual resource with an implementation resource on behalf of the client, the request including at least an association between the requested virtual resource and a proximity color, wherein provisioning the virtual resource includes selecting the implementation resource from an implementation resource pool and launching the requested virtual resource on the selected implementation resource, the proximity color corresponding to a set of implementation resource proximity criteria, the proximity color labeling the requested virtual resource;
    determining a set of potential implementation resources, from the implementation resource pool, based at least in part on selecting at least one of the implementation resources associated with the proximity color from the implementation resource pool of a virtual resource provider;
    provisioning the requested virtual resource with an implementation resource of the set of potential implementation resources; and
    updating at least one data structure corresponding to the set of potential implementation resources of the virtual resource provider with respect to the proximity color, the implementation resource satisfying the set of implementation resource proximity criteria with respect to the selected at least one implementation resource.

20. A computer-implemented method according to claim 19, wherein a proximity of two potential implementation resources corresponds to a joint computational performance of the two potential implementation resources.

21. A computer-implemented method according to claim 19, wherein the set of implementation resource proximity criteria comprises at least one of: a minimum level of communication bandwidth between the potential implementation resources, a maximum level of oversubscription with respect to communication capacity between the potential implementation resources, or a maximum level of communication latency between the potential implementation resources.

22. A computer-implemented method according to claim 19, wherein selecting the implementation resource associated with the proximity color comprises determining that the implementation resource satisfies the set of implementation resource proximity criteria.

23. A computer system, including a processor, for virtual resource provisioning, comprising:
  a plurality of multi-tenant implementation resources collectively capable of implementing a plurality of virtual resources controlled by a plurality of customers of a virtual resource provider;
  a user interface configured to, at least:
    receive a request to provision a virtual resources resource of the plurality of virtual resources, the request including a color designation received from at least one of the plurality of customers; and enable an association of the color designation with the requested virtual resource, the color designation corresponding to a set of implementation resource allocation constraints, the association of the color designation enabled prior to provisioning the requested virtual resource, and the color designation labeling the requested virtual resource to affect implementation of the requested provisioning; and an implementation resource allocation component configured to, at least:

determine sets of implementation resources for virtual resources associated with color designations at least in part by selecting implementation resources that satisfy corresponding sets of implementation resource allocation constraints; and update data structures corresponding to colorable implementation resources with respect to the color designations, wherein a second virtual resource is determined to be provisioned with a particular implementation resource based at least in part on the color designations.

24. A computer system, including a processor, according to claim 23, wherein the user interface comprises a Web-based interface.

25. One or more non-transitory computer-readable media having collectively thereon computer-executable instructions that configure one or more computers to collectively, at least:

receive, from a client, a request to provision, on behalf of the client, a virtual resource with an implementation resource, the request including at least an association between the requested virtual resource and a color designation, the color designation corresponding to a set of implementation resource allocation constraints, the color designation provided by the client to affect provisioning of the requested virtual resource;

identify at least one implementation resource pool associated with the color designation;

determine that the at least one implementation resource pool contains potential implementation resources collectively insufficient to implement the requested virtual resource in accordance with the set of implementation resource allocation constraints;

transition one or more potential implementation resources into the at least one implementation resource pool such that, as a consequence, the at least one implementation resource pool contains potential implementation resources collectively sufficient to implement the requested virtual resource in accordance with the set of implementation resource allocation constraints;

determine a set of potential implementation resources at least in part by selecting at least one implementation resource of the set of potential implementation resources that satisfies the set of implementation resource allocation constraints;

provision the requested virtual resource with the selected at least one implementation resource; and update at least one data structure corresponding to at least one of the set of potential implementation resources of the at least one implementation resource pool with respect to the color designation.

26. One or more non-transitory computer-readable media according to claim 25, wherein the color designation corresponds to at least one of: an exclusory color, an inclusive color, or a proximity color.

* * * * *

UNITED STATES PATENT AND TRADEMARK OFFICE
CERTIFICATE OF CORRECTION

| | | |
|---|---|---|
| PATENT NO. | : 8,533,724 B1 | Page 1 of 1 |
| APPLICATION NO. | : 12/973746 | |
| DATED | : September 10, 2013 | |
| INVENTOR(S) | : Theimer et al. | |

It is certified that error appears in the above-identified patent and that said Letters Patent is hereby corrected as shown below:

In the Claims:

Claim 8, column 20, line 33, please delete "is available to a the user"

and insert -- is available to the user --

Claim 23, column 22, line 64, please delete "receive a request to provision a virtual resources resource"

and insert -- receive a request to provision a virtual resource --

Signed and Sealed this
Third Day of June, 2014

Michelle K. Lee
*Deputy Director of the United States Patent and Trademark Office*